(12) United States Patent
Konomoto et al.

(10) Patent No.: US 6,352,367 B1
(45) Date of Patent: Mar. 5, 2002

(54) SPACER FOR LINER MOTION APPARATUS AND LINER MOTION APPARATUS PROVIDED WITH SPACER

(75) Inventors: Masashi Konomoto; Hidekazu Michioka, both of Tokyo-to (JP)

(73) Assignee: THK Co., LTD, Tokyo-to (JP)

( * ) Notice: Subject to any disclaimer, the term of this patent is extended or adjusted under 35 U.S.C. 154(b) by 0 days.

(21) Appl. No.: 09/560,624

(22) Filed: Apr. 28, 2000

(30) Foreign Application Priority Data

Apr. 30, 1999 (JP) .......................................... 11-124092

(51) Int. Cl.$^7$ ............................ F16C 29/06; F16C 33/38
(52) U.S. Cl. ........................... 384/45; 384/51; 384/520; 384/551
(58) Field of Search .............................. 384/43, 44, 45, 384/49, 51, 520, 551

(56) References Cited

U.S. PATENT DOCUMENTS

| | | | | |
|---|---|---|---|---|
| 1,091,544 A | * | 3/1914 | Starin ........................ 384/520 |
| 1,220,616 A | * | 3/1917 | Englerth ..................... 384/520 |
| 2,827,345 A | * | 3/1958 | Zeilman ..................... 384/520 |
| 2,893,792 A | * | 7/1959 | Wikoff et al. ............... 384/520 |
| 2,897,021 A | * | 7/1959 | Zeilman ..................... 384/520 |
| 3,053,105 A | * | 9/1962 | Cole ........................ 384/43 X |
| 3,208,806 A | * | 9/1965 | Grolmann et al. ......... 384/520 |
| 3,915,513 A | * | 10/1975 | Mayer ......................... 384/44 |
| 4,175,805 A | | 11/1979 | Becker et al. |
| 4,761,820 A | * | 8/1988 | Frank et al. ................ 384/520 |
| 5,927,858 A | * | 7/1999 | Agari .......................... 384/45 |

FOREIGN PATENT DOCUMENTS

| | | |
|---|---|---|
| CH | 621 608 | 2/1981 |
| FR | 1.104.502 | 11/1955 |
| FR | 2 355 201 | 1/1978 |
| JP | 6-173946 | 6/1994 |
| LU | 61956 | 8/1971 |

OTHER PUBLICATIONS

Eoropean Patent Office Communication including European Search Report for European Patent Application No. 00303557 dated Sep. 12, 2000.
"New Concept Revolutionizes Roller Bearings"; *Machine Design*; Nov. 26, 1993; pp. 54–55.

* cited by examiner

Primary Examiner—Thomas R. Hannon
(74) Attorney, Agent, or Firm—Armstrong, Westerman & Hattori, LLP

(57) ABSTRACT

A spacer for a linear motion apparatus is to be interposed alternately between balls arranged in an endless circulation passage of the linear motion apparatus. The spacer has a body portion comprising spherical retaining surface portions formed for supporting the balls on both end portions thereof in an advancing direction of the spacer when moving in the endless circulation passage and a circumferential surface portion constituting an outer peripheral portion of the spherical retaining surface portions. The spherical retaining surface portion has a radius of curvature smaller than a diameter of the ball and the circumferential surface portion is provided with a groove extending in the circumferential direction thereof so that one of the spherical retaining surface portions is elastically deformable towards another one thereof. The spacer is preferably applicable to various kinds of linear motion apparatus. Further, rollers as rolling members may be utilized in place of the balls.

4 Claims, 14 Drawing Sheets

SPACER FOR LINER MOTION APPARATUS AND LINER MOTION APPARATUS PROVIDED WITH SPACER

BACKGROUND OF THE INVENTION

The present invention relates to a spacer, as a rolling member and as a retaining member, interposed between balls or rollers arranged in an endless circulation passage of a linear motion apparatus and also relates to a linear motion apparatus provided with such spacer.

It is conventionally known to interpose spacers between rolling members such as balls or rollers accommodated and arranged in the endless rolling member circulation passage of linear rolling motion guide apparatus, ball screws, ball splines or like, which will be generally called as "linear motion apparatus" herein. The location of such spacers prevents the rolling members from being directly contacted to each other with a proper space being maintained, to make smooth the operation of the liner motion apparatus and to effectively prevent generation of noise caused by collision of the respective rolling members.

However, in the arrangement in which the spacers are interposed each between the rolling members, it is inevitable to cause a dimensional error between a total length of an endless row of the rolling members and the spacers arranged alternately with the state contacted to each other and a total length of the endless circulation passage in which these rolling members and spacers are accommodated. In order to obviate such defect, at least one spacer having a length different from that of another spacer is incorporated as an error absorbing spacer.

In a case of adopting the structure in which such error absorbing spacer is incorporated, in order to obtain or realize the most suitable arranging conditions of the rolling members for a plurality of apparatus or different kinds of devices, it is necessary to prepare a plurality of error absorbing spacers having different lengths and incorporate them by selecting suitable one for each of the linear motion apparatus or devices. However, it is troublesome and inconvenient for the maintenance of parts or the like to always prepare or reserve a plurality of error absorbing spacers for these different kinds of apparatus or devices. Furthermore, since the spacers are usually formed of resin materials, it is also necessary to prepare or manufacture a plurality kinds of molds to manufacture the spacers, involving much cost, thus being inconvenient.

Still furthermore, there is a possibility of existing a slight gap between the rolling members and the rigid spacers even if the error absorbing spacer is incorporated, and such gap may be increased due to wearing of the spacers through a long time use even if the apparatus or device is assembled with substantially no dimensional error at the assembling time.

In order to eliminate such defect, there is provided a countermeasure of using an elastic spacer having an elasticity. When such elastic spacers are used, the elastic spacers are shrunk in the endless row to thereby obtain substantially complete (tight) contact condition between the rolling members and the spacers, and even if the rolling members and the spacers are worn, the spacers are expanded by their elasticity, so that the tight contact condition can be maintained.

There are known examples utilizing such elastic spacers as disclosed in Japanese Utility Model Laid-open Publication No. SHO 53-90158 showing a structure that a spring is interposed between a pair of disc-shaped ball retainers and also disclosed in U.S. Pat. No. 2,827,345 showing a structure two dish-shaped elastic members having recessed portions adjacent to each other. However, in such structures that the elastic spacer is composed of a plurality of portions or elements, there is a fear that the spacer may be disassembled during the use thereof, thus being inconvenient and troublesome in the maintenance thereof and cost increasing will be inevitable, thus being not practical.

Still furthermore, in order to solve the above problem, the prior art further provides an elastic spacer composed of a single member, as disclosed in Japanese Utility Model Publication No. SHO 51-10285, having a ring-shaped spacer body formed with spherical retaining surfaces at both end surfaces in an advancing direction thereof for holding the ball and formed with a slit connecting an inner periphery and an outer periphery of the ring-shaped spacer body. However, since this elastic spacer is elastically deformed so that the ring is opened at both sides of the slit, it is impossible to make large a deformable (displaceable) amount in the advancing direction of the elastic spacer. Because of this reason, it is not sure that such elastic spacer is properly usable for various kinds of linear motion apparatus or devices to be manufactured, and there may cause a case where relative motion of the balls which are going in and out from loaded area and unloaded area. Thus, the smooth circulation of the rolling members cannot be expected.

Still furthermore, a prior art provides an elastic spacer composed of a single member, as disclosed in Japanese Patent Publication No. HEI 4-27405, having a structure in which the spacer is formed, at its both ends in the advancing direction, with curved retaining surfaces for holding the roller and cutouts are formed on the curved retaining surfaces so as to extend in an axial direction thereof. However, such elastic spacer is also elastically deformed so that both sides of the cutout of the curved retaining surface is opened, so that it is impossible to make large a deformable (displaceable) amount in the advancing direction of the elastic spacer.

SUMMARY OF THE INVENTION

An object of the present invention is to substantially eliminate defects or drawbacks encountered in the prior art mentioned above and to provide a spacer, composed of a single member, of a linear motion apparatus capable of having a relatively large elastically deformable amount in its advancing direction and also provide a linear motion apparatus provided with such spacers.

This and other objects can be achieved according to the present invention by providing, in the first aspect, a spacer for a linear motion apparatus which is to be interposed between balls arranged in an endless circulation passage of the linear motion apparatus, the spacer having a body portion comprising spherical retaining surface portions formed for supporting the balls on both end portions thereof in an advancing direction of the spacer when moving in the endless circulation passage and a circumferential surface portion constituting an outer peripheral portion of the spherical retaining surface portions, wherein the spherical retaining surface portion has a radius of curvature smaller than a diameter of the ball and the circumferential surface portion is provided with a groove extending in the circumferential direction thereof so that one of the spherical retaining surface portions is elastically deformable towards another one thereof in the advancing direction.

In a preferred embodiment of this first aspect, the body portion has a length in a direction normal to the advancing direction thereof smaller than the diameter of the ball, and the body portion may be formed of a synthetic resin material through an injection molding process.

According to the spacer of this first aspect, since the spacer is formed as a single member, it is easy to handle or maintain the spacers. Moreover, since the radius of curvature of the spherical retaining surface is made smaller than the diameter of the ball as rolling member, a gap is present therebetween, and since the outer peripheral portion of one of the spherical retaining surfaces is elastically deformable towards the other one thereof, the spacer can be sufficiently elastically deformed in its advancing direction. Therefore, such spacer are applicable to many kinds or types of linear motion apparatus or like, thus being widely practicable.

Much elastically deformable amount of the spacer in its advancing direction makes it possible to ensure sufficient relative movement of the balls on both sides of the spacer, and hence, the circulation between the loaded area and the non-loaded area in the ball circulation passage can be made smooth. Furthermore, in the arranged state of the spacers in the circulation passage, since the outer peripheral portions of the spherical retaining surface portions of the spacers are compressed and contracted, the space between the endless row of the balls and spacers alternately arranged in the circulation passage is made no space (i.e. minus space in the contracted state) with respect to the wall portion thereof, so that the spacers can be positioned at the predetermined constant positions between the balls due to their restoring force, thus preventing the balls from biting the spacers during the rolling motion thereof. Furthermore, since the spherical retaining surface of the spacer can act as an absorbing element for absorbing the balls, so that the balls can be surely arranged in a row, allowing the balls to be smoothly circulated especially in the non-loaded area.

In the second aspect of the present invention, there is provided a spacer for a linear motion apparatus which is to be interposed between balls arranged in an endless circulation passage of the linear motion apparatus, the spacer having a body portion comprising spherical retaining surface portions formed on both end portions thereof in an advancing direction of the spacer when moving in the endless circulation passage for supporting the balls and a circumferential side surface portion, the circumferential side surface portion being formed with at least one slit extending in a direction normal to the advancing direction of the spacer so that one of the spherical retaining surface portions is elastically deformable towards another one thereof in the advancing direction.

In a preferred embodiment of this second aspect, the spherical retaining surface portion has a radius of curvature substantially equal to a diameter of the ball. The body portion has a length, in a direction normal to the advancing direction thereof, smaller than the diameter of the ball. Three slits may be formed on the circumferential side surface portion of the spacer body in substantially equal angular arrangement.

The body portion may be formed of a synthetic resin material through an injection molding process.

According to the spacer of this second aspect, since the spacer is formed as a single member, it is easy to handle or maintain the spacers, contributing to cost reduction. Moreover, since the outer peripheral portion of one of the spherical retaining surfaces is elastically deformable towards the other one thereof, the spacer can be sufficiently elastically deformed in its advancing direction. Therefore, such spacer are applicable to many kinds or types of linear motion apparatus or like, thus being widely practicable.

Much elastically deformable amount of the spacer in its advancing direction makes it possible to ensure sufficient relative movement of the balls on both sides of the spacer, and hence, the circulation between the loaded area and the non-loaded area in the ball circulation passage can be made smooth. Furthermore, in the arranged state of the spacers in the circulation passage, since the outer peripheral portions of the spherical retaining surface portions of the spacers are compressed and contracted, the space between the endless row of the balls and spacers alternately arranged in the circulation passage is made no space (i.e. minus space) with respect to the wall portion thereof, so that the spacers can be positioned at the predetermined constant positions between the balls due to their restoring force, thus preventing the balls from biting the spacers during the rolling motion thereof.

Furthermore, since the spacer is formed, on its side portion, with a slit or slits, one of the spherical retaining surface portion can be inclined to the other one thereof, so that both the spherical retaining surface portions can be inclined in the rolling direction changing passage to thereby smoothly change the ball rolling direction in this passage.

In the third aspect of the present invention, there is also provided a spacer for a linear motion apparatus which is to be interposed between rollers arranged in an endless circulation passage of the linear motion apparatus, the spacer having a body portion comprising curved retaining surface portions formed for supporting the rollers both end portions thereof in an advancing direction of the spacer when moving in the endless circulation passage and side surface portions connecting both the curved retaining surface portions and extending in a direction normal to the advancing direction, wherein an inner hollow portion is formed in the spacer body and defined by the curved retaining surface portions and the side surface portions, the inner hollow portion extending in a direction substantially parallel to an axial direction of the roller so that one of the curved retaining surface portions is elastically deformable towards another one thereof.

In a preferred embodiment of this third aspect, the body portion has a length in the axial direction of the roller which is smaller than an axial length of the roller and has a height smaller than a length of the roller in a direction normal to the axial direction thereof. The body portion may be formed of a synthetic resin material through an injection molding process.

According to the spacer of this third aspect, since the spacer is formed as a single member, it is easy to handle or maintain the spacers, contributing to cost reduction. Moreover, since one of the spherical retaining surfaces is elastically deformable towards the other one thereof, the spacer can be sufficiently elastically deformed in its advancing direction. Therefore, such spacer are applicable to many kinds or types of linear motion apparatus or like, thus being widely practicable.

Much elastically deformable amount of the spacer in its advancing direction makes it possible to ensure sufficient relative movement of the rollers on both sides of the spacer, and hence, the circulation between the loaded area and the non-loaded area in the roller circulation passage can be made smooth. Furthermore, in the arranged state of the spacers in the circulation passage, since the rollers are compressed and contracted, the space between the endless row of the rollers and spacers alternately arranged in the circulation passage is made no space (i.e. minus space) with respect to the wall portion thereof, so that the spacers can be positioned at the predetermined constant positions between the rollers due to their restoring force, thus preventing the rollers from biting the spacers during the rolling motion thereof.

In the further aspect of the present invention, there is also provided a linear motion apparatus comprising:

a track member formed with a roller rolling surface;

a slide member mounted to be relatively movable to the track member formed with a roller circulation passage including a loaded roller rolling groove opposing to the roller rolling surface of the track member when mounted, the slide member being provided with a guide groove formed along the roller circulation passage;

a number of rollers arranged in the roller circulation passage so as to circulate therein in conformity with the relative motion of the slide member with respect to the track member; and a number of spacers arranged between the rollers in an alternate manner, each of the spacers comprising curved retaining surface portions formed for supporting the rollers on both end portions in an advancing direction of the spacer when moving in the endless circulation passage and side surface portions connecting both the curved retaining surface portions and extending in a direction normal to the advancing direction, the curved retaining surface portions and the side surface portions defining an inner hollow portion extending in a direction substantially parallel to an axial direction of the roller so that one of the curved retaining surface portions is elastically deformable towards another one thereof, each of the spacers further comprising a projection piece formed on the side surface portion of the spacer so as to project into the guide groove formed on the slide member when assembled.

In a preferred embodiment of this aspect, the projection piece has a free front end having a circular space. The projection piece is a plate member formed at substantially the central portion of one side surface portion of the spacer in the advancing direction. The body portion has a length in the axial direction of the roller which is smaller than an axial length of the roller and has a height smaller than a length of the roller in a direction normal to the axial direction thereof.

According to the spacer of this aspect, since the spacer is formed as a single member, it is easy to handle or maintain the spacers, contributing to cost reduction. Moreover, since one of the curved retaining surfaces is elastically deformable towards the other one thereof, the spacer can be sufficiently elastically deformed in its advancing direction. Therefore, such spacer are applicable to many kinds or types of linear motion apparatus or like, thus being widely practicable.

Moreover, in this aspect, the spacers are formed with the projection plates which are inserted into the guide groove formed on the roller circulation passage, so that the rollers can be smoothly moved and guided along the predetermined track in the circulation passage without meandering therein.

The nature and further characteristic features of the present invention will be made more clear from the following descriptions made with reference to the accompanying drawings.

DESCRIPTION OF THE PREFERRED EMBODIMENTS

Figure 1:
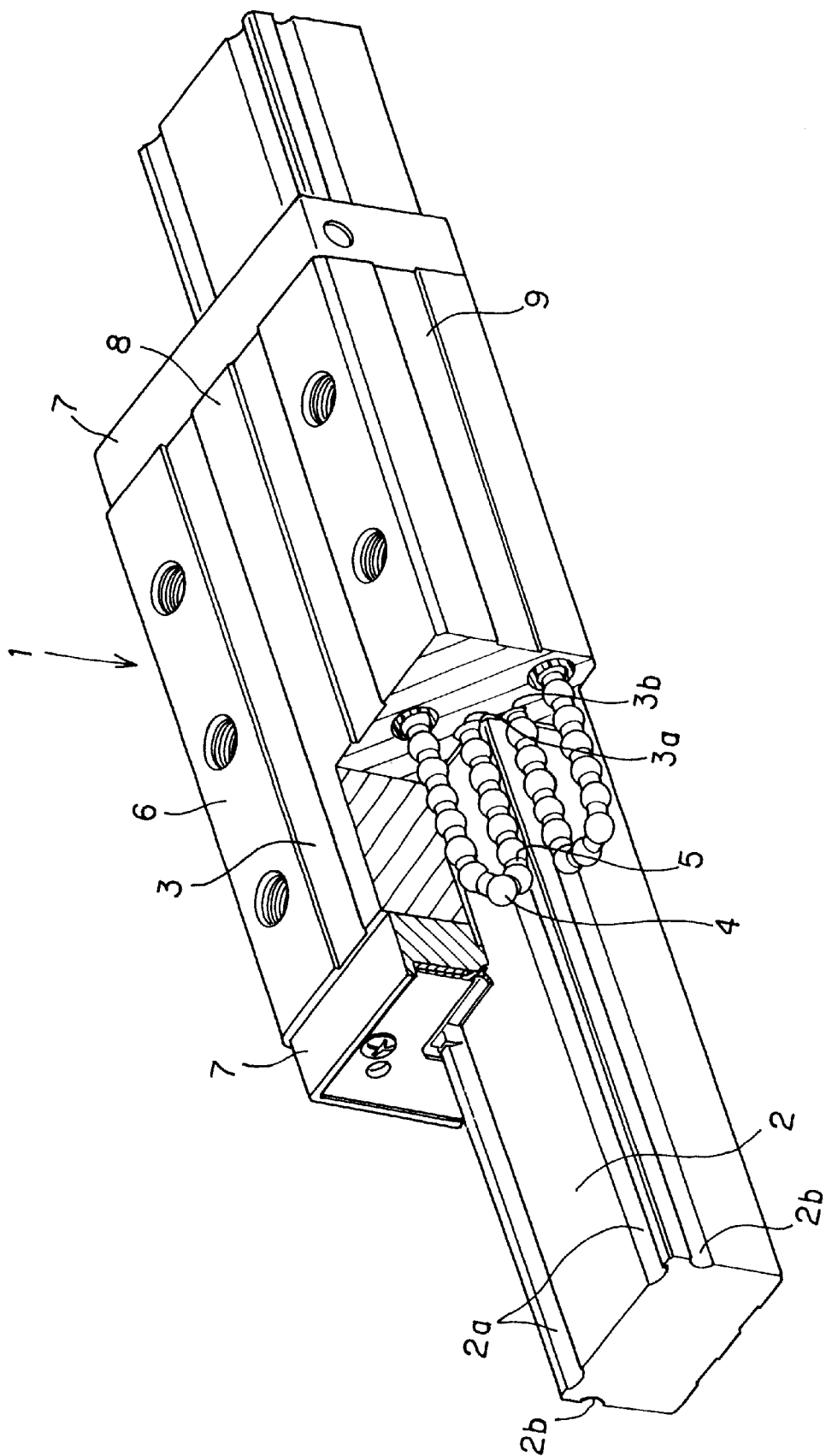
FIG. 1 is a perspective view showing a linear rolling motion guide apparatus, as a linear motion apparatus, incorporated with a spacer according to a first embodiment of the present invention.
Figure 2:
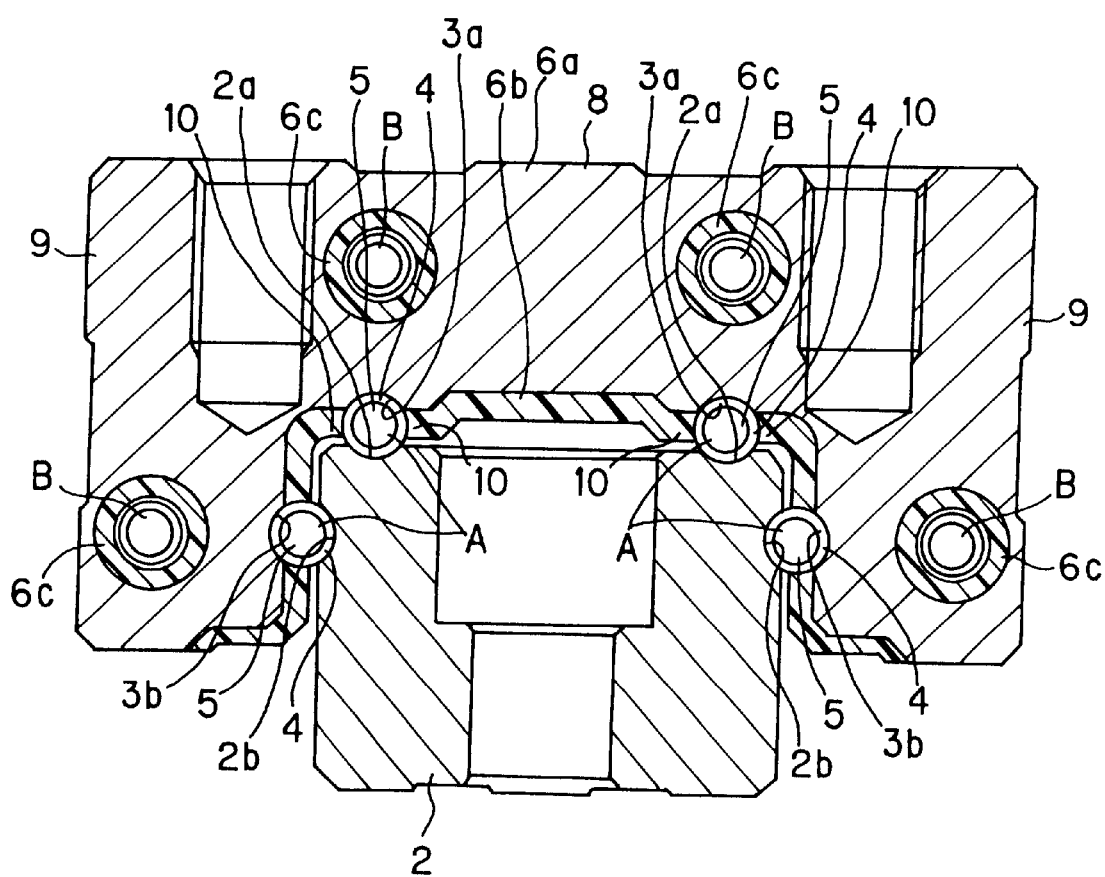
FIG. 2 is a sectional view of the linear rolling motion guide apparatus incorporated with the spacer according to the first embodiment.

With reference to FIGS. 1 and 2, a linear rolling motion guide apparatus 1 provided with spacers according to the first embodiment of the present invention is adapted to linearly guide a movable member such as table or like on a fixed (fixing) member such as bed, saddle or like. The linear rolling motion guide apparatus 1 comprises a guide rail (track shaft) 2 disposed on the fixed member and formed with ball (rolling member) rolling grooves 2a, 2b extending along a longitudinal direction thereof, a movable block (slide member) 3 formed with a ball circulation passage including a loaded ball rolling groove 3a corresponding to the ball rolling groove 2a of the guide rail 2 and assembled with the guide rail 2 to be relatively movable along the guide rail 2, a number of balls (rolling members) 4, 4, - - - , 4 arranged in the ball circulation passage and circulating therein in conformity with the relative motion of the movable block 3 with respect to the guide rail 2, and a plurality of spacers 5, 5, - - - , 5 interposed alternately between a plurality of balls 4.

The guide rail 2 has a long scale member having substantially a rectangular cross section. Two rows of the ball rolling grooves 2a as tracks for rolling the balls 4 are formed on side end portions of the upper surface of the guide rail 2 so as to extend along the entire longitudinal direction thereof, and one row of the ball rolling groove 2b as track for rolling the balls 4 is also formed on an upper portion of each of side surfaces of the guide rail 2 so as to extend along the entire longitudinal direction thereof. A plurality of bolt holes for fixing the guide rail 2 to the fixed member are formed in the longitudinal direction of the guide rail 2. Further, it is to be noted that a curved guide rail may be utilized in place of the linear guide rail shown in FIG. 1 and, in the illustrated example, as mentioned above, although the upper two rows and side two rows of ball rolling grooves 2a, 2b (four rows in total) are formed on the guide rail 2, the number of rows may be changed in accordance with design, usage, objects of the linear rolling motion guide apparatus 1.

The movable block 3 comprises a body portion 6 and end covers (plates) 7 disposed on both longitudinal end sides of the body portion 6, the body portion 6 and the end covers 7 being secured together by means of bolts. As shown in FIG. 2, the body portion 6 is composed of a body block 6a and mold products 6b and 6c. The body block 6a has high rigid structure formed of a rigid material such as steel so as to withstand a load applied to the movable block 3 and is formed, on its upper surface as viewed, with screw holes for fixing an object to be guided by the guide apparatus. The mold products 6b and 6c are integrally formed with the body block 6a by injecting a fused resin into a mold in which the body block 6a is placed, i.e: through a so-called insert molding method. Further, a metal such as aluminium may be utilized in place of the resin, and in such case, the body portion 6 is formed through a die-casting method. On the other hand, in place of the above method, the mold produces 6b and 6c may be manufactured independently from the body block 6a, which will be thereafter assembled, or may be formed integrally through an MIM (metal-injection-mold) method.

The body portion 6 comprises, to provide substantially ⊐-shaped cross section as viewed in FIG. 2, a horizontal portion 8 opposing (facing) to the upper surface of the guide rail 2 and bilateral skirt (leg) portions 9 extending downward from both end portions of the horizontal portion 8 and opposing to side surfaces of the guide rail 2 when the movable block 3 is assembled with the guide rail 2.

The horizontal portion 8 is formed with two rows of loaded ball rolling grooves 3a respectively opposing to the two ball rolling grooves 2a formed on the upper surface of the guide rail 2 and the skirt portions 9 each is formed with one row of the loaded ball rolling groove 3b opposing to the ball rolling groove 2b formed on each side portion of the guide rail 2. Loaded ball rolling passages A are formed in combination of the ball rolling grooves 2a and the loaded ball rolling grooves and the ball rolling grooves 2b and the loaded ball rolling grooves 3b, respectively.

The horizontal portion 8 are formed with two through holes extending in parallel to the loaded ball rolling grooves 3a and tubular portions of the mold products 6c are integrally formed with the through holes. Return passages B are formed in the tubular portions of the mold products 6c formed with the through holes for returning the balls 4, 4, - - - , 4.

The skirt portions 9 are also formed with through holes each extending in parallel to the loaded ball rolling groove 3b, and tubular portions of the mold products 6c are integrally formed with these through holes. Return passages B are formed in the tubular portions of the mold products 6c formed with the through holes for returning the balls 4, 4, - - - , 4.

The mold product 6b is formed integrally with the lower surface of the horizontal portion 8 and entire inner side surfaces of the skirt portions 9 of the block body 6a. Ball retainers 10 are formed on the mold product 6b for preventing the balls from coming off from the loaded ball rolling passages A at a time when the movable block 3 is removed from the guide rail 2.

Figure 3:
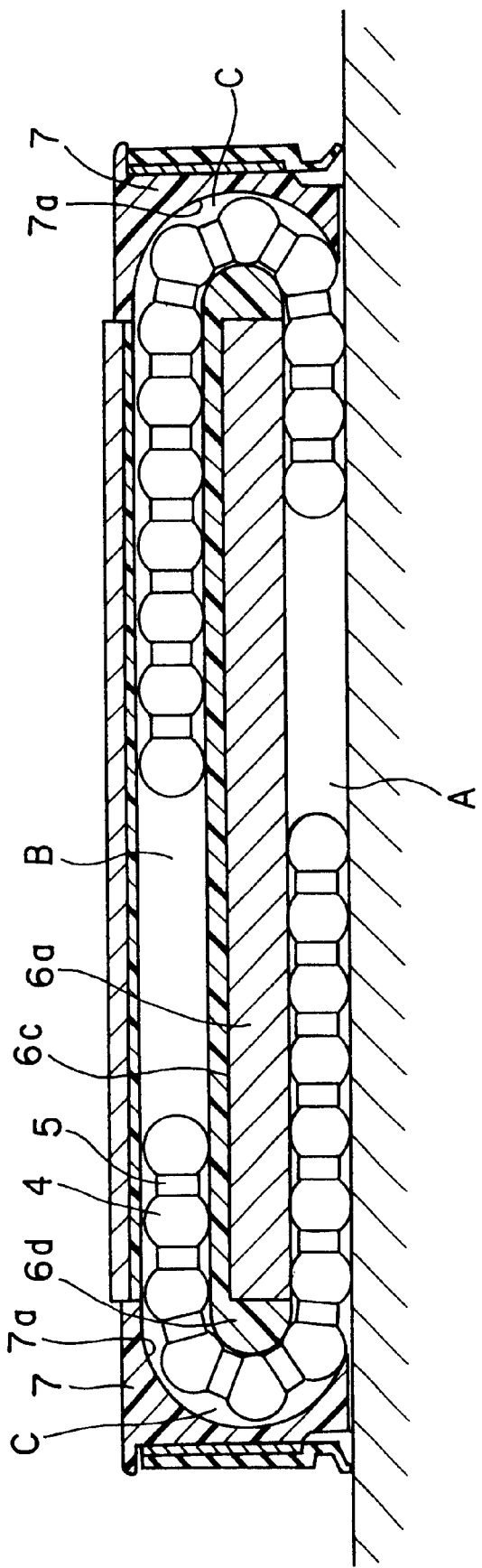
FIG. 3 is a sectional view of a ball circulation passage along an axial direction of a rail of the linear rolling motion apparatus of FIG. 1.

With reference to FIG. 3, the mold product 6c is formed with arch-shaped inner periphery guide portions 6d which project at both the end portions of the body block 6a for forming a rolling member (ball) rolling direction changing passage C, and the end covers 7 are formed with outer periphery guide portions 7a forming the direction changing passage C in combination of the inner periphery guide portions 6d. That is, when the end covers 7 are mounted to the body portion 6, the inner and outer periphery guide portions 6d and 7a are assembled to thereby constitute the U-shaped ball rolling direction changing passages C at both the end portions. The endless circulation passage is constituted by the loaded ball rolling passage A, the return passage B and the U-shaped direction changing passages C when assembled.

Figure 4:
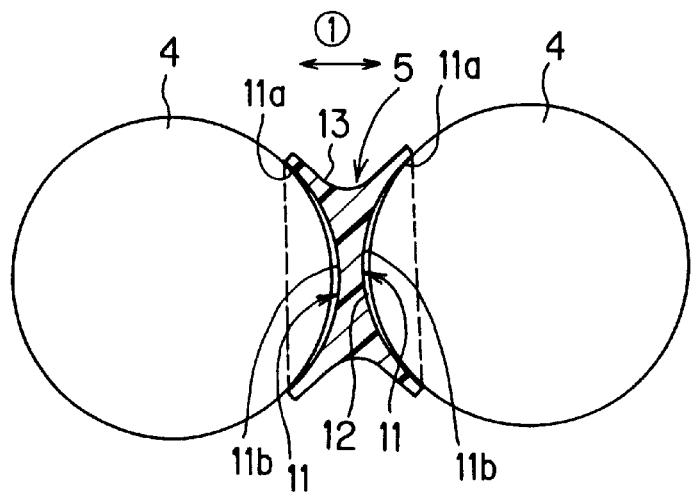
FIG. 4 is an illustrated sectional view of the spacer of the first embodiment and the balls to be retained thereby.
Figure 5A:
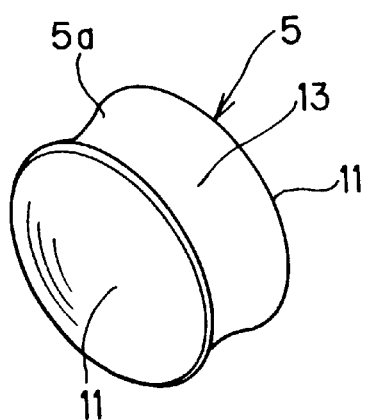
FIG. 5 shows the spacer of the first embodiment and includes FIG. 5A showing a perspective view thereof and FIG. 5B showing a sectional view thereof.
Figure 5B:
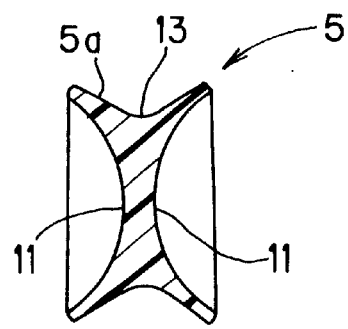
Figure 6:
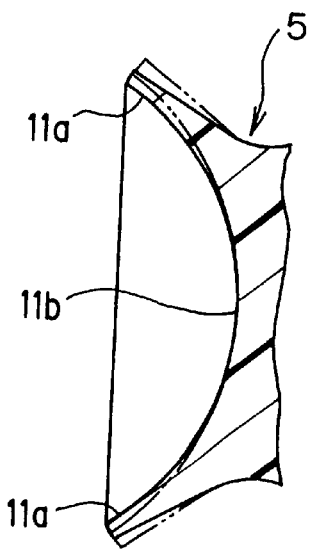
FIG. 6 is a partial sectional view of the spacer of the first embodiment.

FIGS. 4 to 6 show a spacer 5 to be assembled with the linear rolling motion guide device 1 shown in FIG. 1, for example. The spacer 5 is preferably made of a synthetic resin material through an injection molding process, for example. With reference to FIG. 4, each of the spacers 5 is disposed between the balls 4 and is formed with spherical ball retaining surfaces 11, 11 for holding the balls 4 at both end portions thereof in a advancing direction (direction ①. in FIG. 4) of the spacer 5. The spherical ball retaining surface 11 has a radius of curvature which is set to be smaller than a radius of the ball 4. For this setting, even in a state that outer peripheral portions 11a, 11a of the spherical ball retaining surfaces 11, 11 abut against the balls 4, 4, gaps 12, 12 remain between the balls 4, 4 and central portions 11b, 11b of the spherical ball retaining surfaces 11, 11, respectively. When the outer peripheral portions 11a, 11a contact the balls 4, 4, the spacer 5 is positioned on a line connecting the balls 4, 4. The diameter of the spacer 5 is set so as to be smaller than that of the ball 4 to prevent the ball 4 from colliding with the wall portion of the endless ball circulation passage. The spacer 5 has a thickness in its axial direction set to be thin so that a distance between the adjacent balls 4, 4 becomes small. Further, The central portion 11b of the spherical ball retaining surface 11 may be formed with an oil reservoir hole axially penetrating the spacer as a lubricant storing portion.

With reference to FIGS. 5A and 5B, the spacer 5 also has side surface 5a, as viewed, other than the spherical ball retaining surfaces 11, 11, and the side surface 5a is formed with a groove 13, having a V-shape in section, extending in the circumferential direction of the spacer 5. According to the formation of such V-shaped groove 13, the outer peripheral portions 11a, 11a of the spacer 5 are made thin so as to be provided with flexibility, so that one outer peripheral portion 11a of one spherical ball retaining surface 11 is elastically deformable towards the other one 11a of the other side surface 11 of the spacer 5 as shown in FIG. 6. As mentioned above, since the gaps 12, 12 are formed between the balls 4, 4 and the spacer 5 and the outer peripheral portions 11a, 11a are elastically deformable, the spacer 5 can be sufficiently elastically deformed in its advancing direction, i.e. direction ①. in FIG. 4.

Furthermore, as shown in FIG. 3, the spacers 5, 5, - - -, 5 and the balls 4, 4, - - -, 4 are alternately arranged in the endless circulation passage, and when the spacers 5 and the balls 4 are accommodated therein, the spacers 5 are elastically deformed as mentioned above, so that the balls 4 and the spacers 5 are not damaged. In the arrangement of the spacers and the balls 4 in the endless circulation passage, since the outer peripheral portions 11a of the spherical ball retaining surfaces 11 of the spacer 5 are compressed and hence contracted, the endless row of the spacers 5 and the balls 4 are tightly contacted, with no gap, i.e. minus gap in the contracted state, to the wall portion of the endless circulation passage. Therefore, the respective spacers 5 are tightly clamped between the adjacent balls 4 by the elastic restoring force of the spacers 5 so as to take constant positions, and accordingly, the axial line of the spacer 5 accord with the center lines of the two balls between which that spacer 5 is arranged. There is no fear that the balls 4 bites the spacer 5 during the circulation thereof in the endless circulation passage.

According to the movement of the movable block 3 along the guide rail 2, the balls 4, 4, - - -, 4 are moved (rolled) from one end to the other end of the loaded ball rolling passage A while being applied with the load from the movable block 3, scooped by one of the direction changing passages C, guided to the return passage B and then returned to the one end of the loaded ball rolling passage A through the other one of the direction changing passages C. In this circulation motion, the balls 4 roll, with the load being applied, in the loaded ball rolling passage A and circulate in the non-loaded direction changing passages C and the nonloaded loaded return passage B. Generally, the balls 4 move at a relatively high speed in the loaded area and at a relatively slow speed in the non-loaded area. According to the present invention, the spacers 5 are sufficiently elastically deformed in their advancing direction and one of the balls 4, 4, disposed on both sides of the spacer 5 can be moved relatively to the other one thereof, the balls 4 can smoothly pass the boundary portions between the loaded area and the non-loaded area in the endless circulation passage and, hence, smoothly circulated therein.

Furthermore, since the spherical ball retaining surfaces 11 of the spacer 5 has a sucking function, the spacer can suck the balls 4, thus constituting a smooth series of ball row. According to the arrangement of the present invention, not only the balls 4 rolling in the loaded area circulate therein while pushing the balls 4 in the non-loaded area, but also the balls 4 rolling in the loaded area pull the balls 4 into the non-loaded area, so that the circulation of the balls 4 in the nonloaded area can be further smoothly performed.

Further, although, in the described embodiment, the linear motion of the movable block 3 and the guide rail 2 is linearly performed, the present invention may involve an embodiment in which the relative motion thereof are curvilinearly performed.

Figure 7:
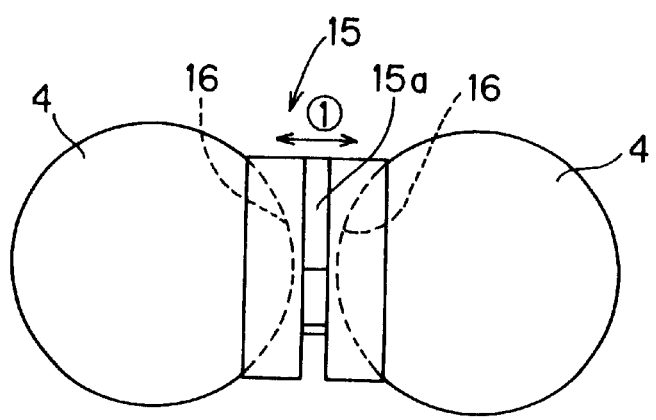
FIG. 7 is a side view of a spacer according to a second embodiment of the present invention and balls to be retained thereby.
Figure 8A:
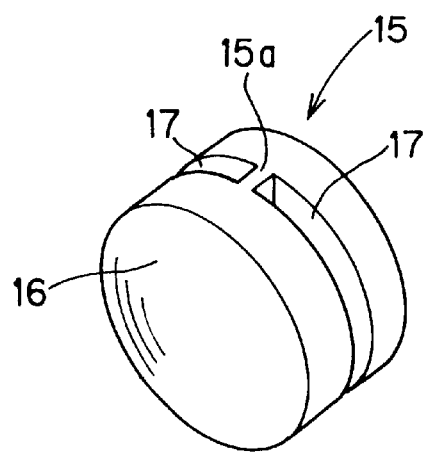
FIG. 8 shows the spacer of the second embodiment and includes FIG. 8A showing a perspective view thereof, FIG. 8B showing a sectional view thereof taken along a line perpendicular to a spacer advancing direction
FIG. 8C is a sectional view thereof in the advancing direction.
Figure 8B:
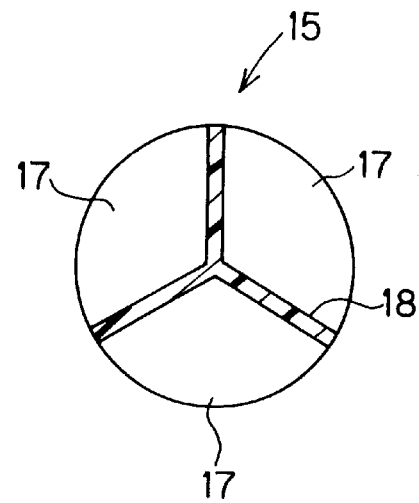
Figure 8C:
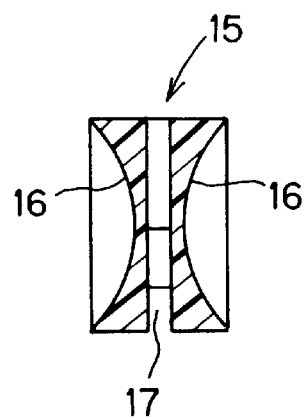

FIGS. 7 and 8 show a spacer 15 according to a second embodiment of the present invention.

With reference to FIGS. 7 and 8, the spacer 15 is also made of a synthetic resin through an injection molding process. The spacer 15 has substantially a cylindrical shape and is formed with spherical ball retaining surfaces 16, 16 for holding the balls 4, 4 at both end portions in the advancing direction thereof, i.e. direction ①. in FIG.7. The spherical ball retaining surface 16 has a radius of curvature substantially equal to that of the ball 4 so that the spherical ball retaining surface 16 entirely contacts the ball 4. When the spherical ball retaining surfaces 16 contact the balls 4, the axial lines of the spherical ball retaining surfaces 16 accord with the center lines of the balls 4. The diameter of the spacer 15 is set to be smaller than the diameter of the ball 4 so as not to contact the wall portion of the endless ball circulation passage, and a thickness of the spacer 15 in its axial direction is made thin so as to make a small distance between the balls 4, 4.

With reference to FIG. 8, at the central portion in the spacer advancing direction, of a side surface 15a of the spacer 15, there is formed a slit 17 finely extending in a direction normal to the advancing direction so that one spherical ball retaining surface 16 can be elastically deformed towards the other one spherical ball retaining surface 16. In a preferred example, three slits 17 may be formed in the circumferential direction of the spacer 15 and sectioned by three partitioning portions 18 extending equally in three directions (at equal angular relationship) from the central portion of the spacer 15 in the state shown in FIG. 8B. The partitioning portions 18 each has extremely small sectional area so that the spacer 15 is easily deformed (contracted) in its advancing direction.

In the arrangement of the second embodiment, in which the spacer 15 is assembled with the linear rolling motion guide apparatus 1, as like as the spacer 5 in the first embodiment described hereinbefore, one of the spherical ball retaining surfaces 16 holding the balls 4 is elastically deformed towards the other one thereof, the spacer 15 itself can be sufficiently deformed in its advancing direction. Accordingly, the balls 4, 4 on both the side of the spacer 15 can be relatively moved and can be moved smoothly from the loaded area to the non-loaded area or vice versa in the endless circulation passage. Furthermore, the formation of the slits 17 to the side surface 15a of the spacer 15 renders the one spherical ball retaining surface 16 to be deformed so as to incline with respect to the other one spherical ball retaining surface 16, so that the paired spherical ball retaining surfaces 16 of the spacer 15 relatively incline at the ball rolling direction changing passage to thereby make it possible to smoothly change the ball rolling direction. Still furthermore, since the spacers 15 are compressed and hence contracted in the advancing direction, the endless row of the balls and spacers, which are alternately arranged in series in the endless circulation passage, is tightly contacted to the wall portion thereof with substantially no space (i.e. minus gap in the contracted assembled state). Accordingly, the balls 4, 4, - - -, 4 can be tightly clamped in constant positions between the spacers 15 by the restoring force thereof, thus being no fear that the balls 4, 4 bite the spacers 15 during the rolling motion in the endless circulation passage.

Figure 9:
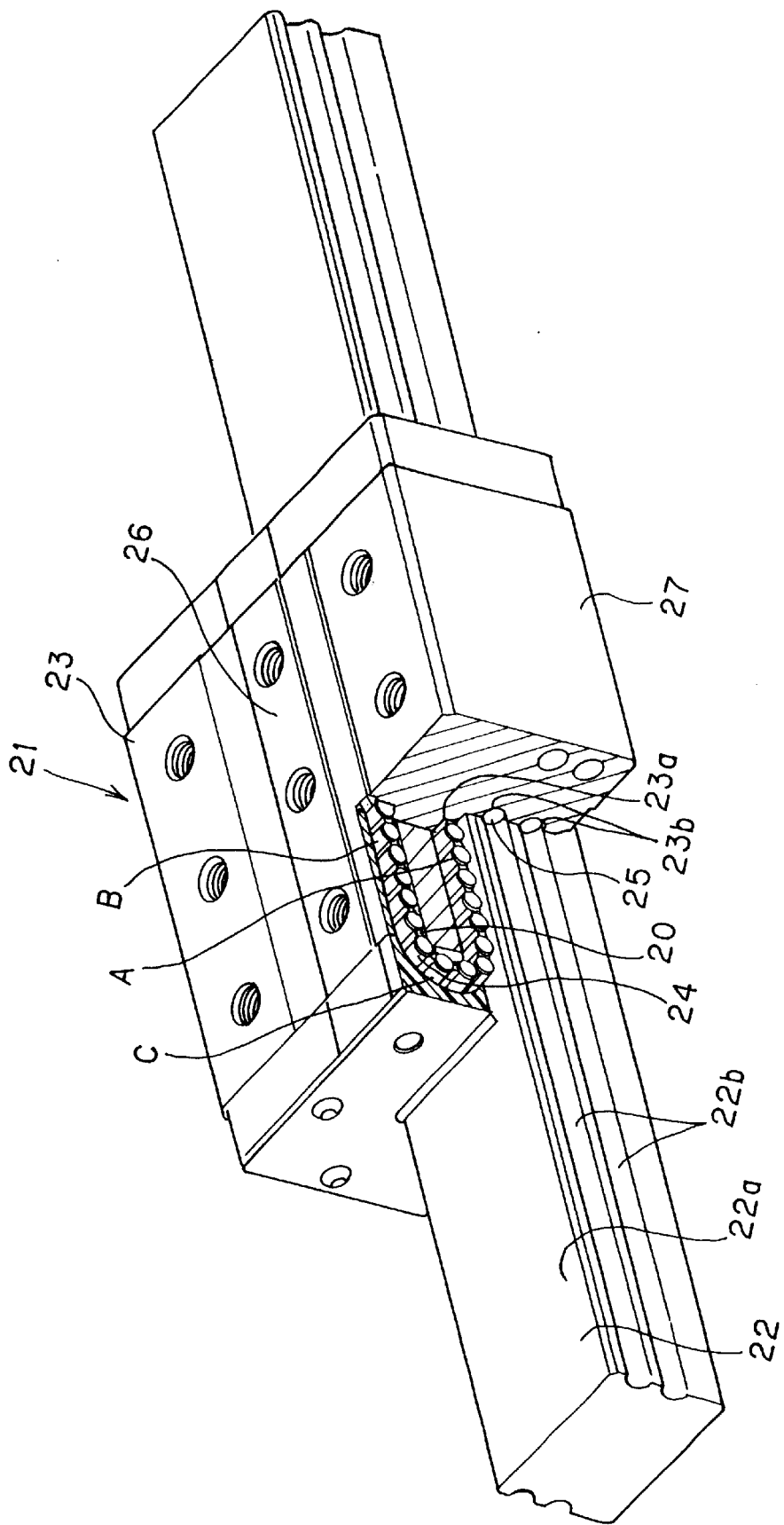
FIG. 9 is a perspective view showing a linear rolling motion guide apparatus incorporated with a spacer according to a third embodiment of the present invention.

FIG. 9 shows a linear rolling motion guide apparatus 21 incorporated with spacers 20 according to a third embodiment of the present invention.

With reference to FIG. 9, the linear rolling motion guide apparatus 21 comprises a guide rail 22, a movable block 23 assembled with the guide rail 22 to be relatively movable along the guide rail 22, a number of rollers 24, 24, - - -, 24, a number of balls 25, 25, - - -, 25 and a number of spacers 20 disposed between the respective rollers 24 and between the respective balls 25.

The guide rail 22 is formed, at its upper surface as viewed, a roller rolling surface 22a and with, at its both side surfaces, ball rolling grooves 23a. The movable block 23 is formed with a roller circulation passage including a roller rolling groove 23a corresponding to the roller rolling surface 22a and with a ball circulation passage including loaded ball rolling grooves 23b corresponding to the ball rolling grooves 22b of the guide rail 22. The rollers 24 are accommodated and arranged in the roller circulation passage and circulate therein in accordance with the relative motion of the movable block 23 with respect to the guide rail 22, and in this embodiment, the roller 24 has a cylindrical shape having a circular cross section when cut along the rolling direction thereof. The balls 25 are accommodated and arranged in the ball circulation passage and circulate therein in accordance with the relative motion of the movable block 23 with respect to the guide rail 22.

The guide rail 22 has substantially a rectangular shape in section and is formed with the roller rolling surface 22a on its upper surface and with both side surfaces to which respectively two rows of upper and lower ball rolling grooves 22b (totally four grooves) are formed. The roller rolling surface 22a provides a horizontally flat surface, and the ball rolling groove 22b has a circular sectional shape.

The movable block 23 comprises a horizontal portion 26 opposing to the upper surface of the guide rail 22 when assembled and right and left skirt (leg) portions 27 extending downward from both side ends of the horizontal portion 26 of the guide rail and opposing to the side surfaces of the guide rail 22 when assembled. The horizontal portion 26 has a lower surface to which two roller rolling groove 23a are formed so as to correspond to the roller rolling surfaces 22a of the guide rail 22, and the skirt portions 27 each has an inner side surface to which two rows of ball rolling grooves 23b are formed so as to correspond to the ball rolling grooves 22b. The roller rolling groove 23a has a rectangular sectional shape, and the rollers 24 roll on the upper bottom surfaces of the roller rolling grooves 23a. The bilateral inside surfaces of the roller rolling groove 23a are parallel to each other and a small gap is formed between the end faces of the roller 24 and the inside surfaces of the roller rolling groove 24. According to such structure, the roller 24 is guided by the bilateral inside surfaces of the roller rolling groove 23a. The depth of the roller rolling groove 23a is formed to be smaller than the radial length of the roller 24 and, for example, is of about half length of the radius of the roller 24.

The loaded roller rolling passages A are formed between the roller rolling surfaces 22a of the guide rail 22 and the roller rolling grooves 23a of the movable block 23 when assembled. The movable block 23 is also formed with two roller return passages B extending in parallel to the loaded roller rolling passages A, respectively, and four (each, two) rolling direction changing passages C, each in U-shape, connecting the loaded roller rolling passages A and the roller return passages B, respectively, to thereby form two rows of endless roller rolling passages in combination. Furthermore, the both side skirt portions 27 of the movable block 23 are each formed with upper and lower two rows of endless ball circulation passages in conformity with two rows of the balls 25.

Figure 10:
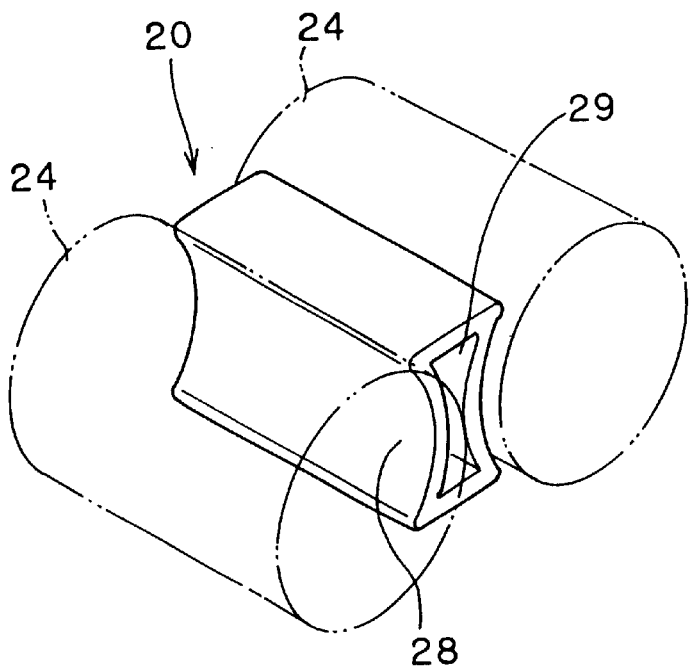
FIG. 10 is a perspective view of the spacer and rollers according to the third embodiment.
Figure 11:
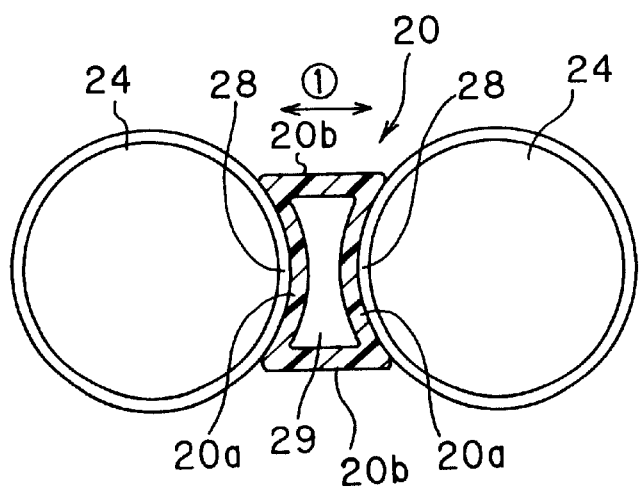
FIG. 11 is a sectional view showing the spacer and the rollers according to the third embodiment.

FIGS. 10 and 11 show the spacer 20 to be assembled with the linear rolling motion guide apparatus 21 so as to be interposed between the rollers 24, 24 of the structure mentioned above. The spacer 20 is formed from a synthetic resin, for example, through an injection molding process. The roller 24 has curved retaining surfaces 28 at both end portions in an advancing direction (direction ①. in FIG. 11) of the spacer 20. The curved retaining surface has a shape corresponding to a circumferential shape of the roller 24. When the curved retaining surfaces 28 of the spacer 20 abut against the rollers 24 on both end sides, the central line of the spacer 20 accords with the line connecting the central portions of the rollers 24 disposed on both sides thereof. The spacer 20 has a length, normal to the advancing direction corresponding to the axial direction of the roller 24, slightly smaller than the axial length of the roller so as not to contact the wall portion of the endless roller circulation passage, and the spacer 20 also has a height slightly smaller than a diameter of the roller 24.

The spacer 20 has an inner hollow structure having a cavity so that one of the curved retaining surfaces 28 is deformable towards the other one thereof, the cavity extending in the direction parallel to the axial direction of the roller 24. That is, the spacer 20 comprises a pair of retaining portions 20a, each having the curved retaining surface 28, opposing to each other in the advancing direction and a pair of upper and lower connection portions 20b connecting the paired retaining portions 20a with the cavity therebetween. Since the connection portions 20b are formed to be thin so as to be easily flexed, one of the curved retaining surfaces 28 is elastically deformed towards the other one thereof.

The spacers 20 of the structure mentioned above and the rollers 24 are accommodated in the endless roller circulation passage in an alternate arrangement to each other. When the spacers 20 and the rollers 24 are assembled therein, since the spacers 20 are arranged in the state tightly compressed in the advancing direction, there is substantially no space or gap between the row of the rollers 24 and the spacers 20 and the wall portion of the endless circulation passage. Accordingly, each of the spacers 20 is firmly clamped between the adjacent rollers 24, 24 to a constant predetermined position by the restoring force of the spacer 20 itself, and hence, there is no fear that the rollers 24 bite the spacers 20 during the circulation thereof.

With reference to FIG. 9, as the movable block 23 moves along the guide rail 20, the rollers 24, 24, - - - , 24 roll, while being applied with the load from the movable block 23, in the loaded roller rolling passage A from one end to the other end thereof. Thereafter, the rollers 24 are scooped by one of the rolling direction changing passages C, then guided to the return passage B, and thereafter, returned to the one end of the loaded roller rolling passage A by way of the other one of the rolling direction changing passage C. In this circulation motion, the rollers 24 roll with the loaded state in the loaded area of the loaded roller rolling passage A and roll with the non-loaded state in the non-loaded area of the direction changing passages C and the return passage B. In general, the rollers 24 roll fast in the loaded area and slow in the non-loaded area.

According to this third embodiment of the present invention, since the spacers 20 are sufficiently elastically deformed in the advancing direction and one of the rollers 24 disposed on both advancing sides of the spacer can be relatively moved with respect to the other one of the rollers 24, the rollers 24 can be smoothly moved between the loaded area and the non-loaded area in the endless roller circulation passage.

Figure 12:
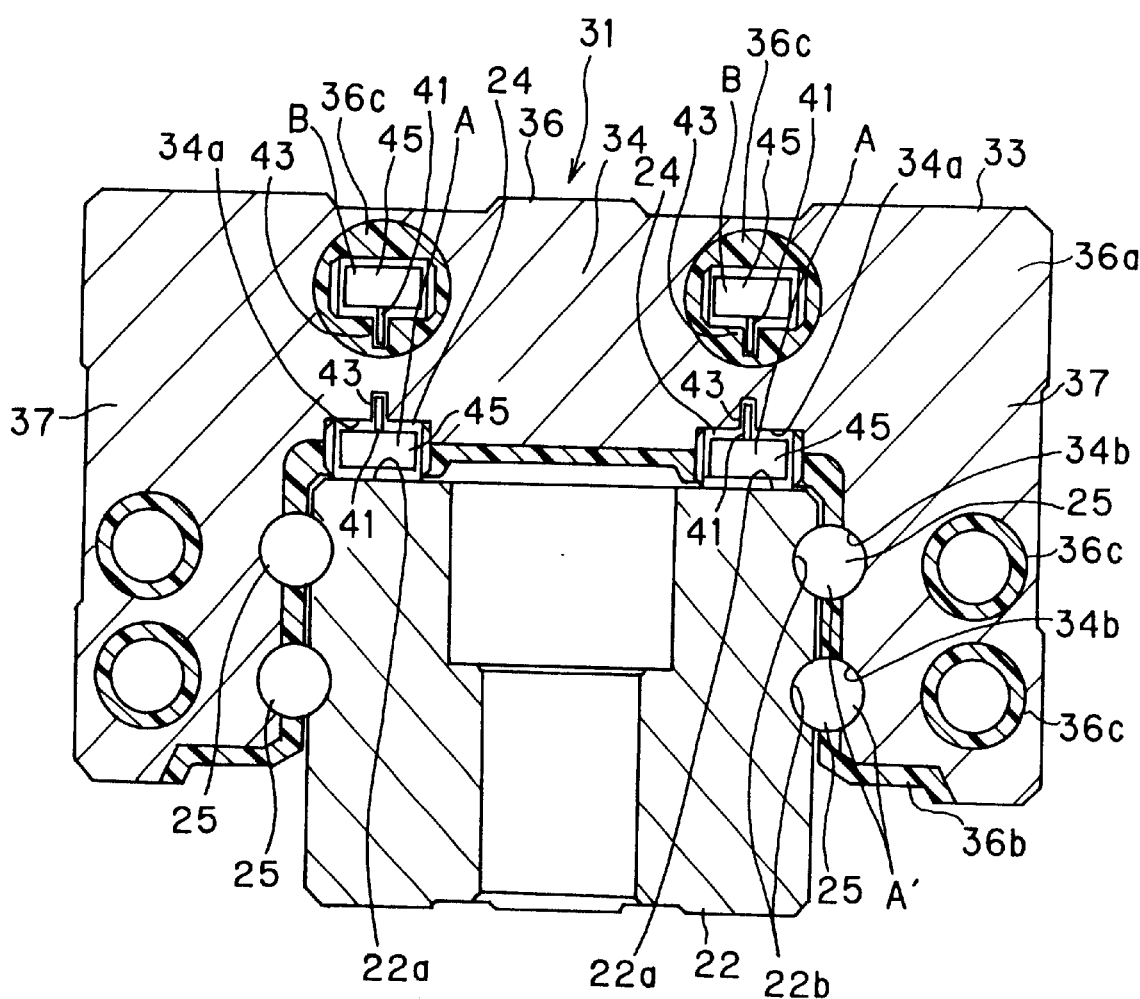
FIG. 12 is a sectional view of a linear rolling motion guide apparatus incorporated with a spacer according to a fourth embodiment of the present invention.
Figure 13:
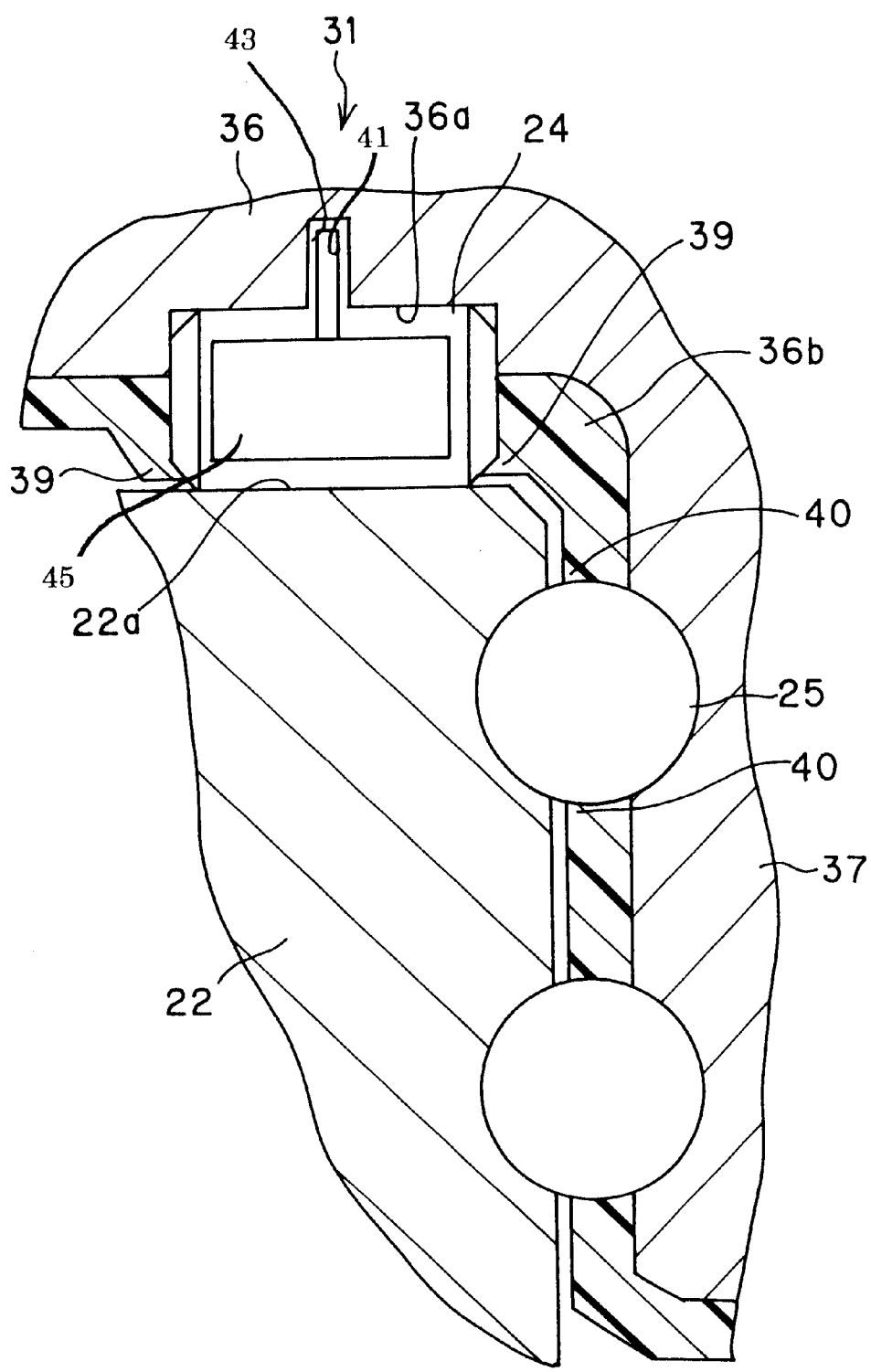
FIG. 13 is a partial sectional view of FIG. 12 in an enlarged scale.
Figure 14:
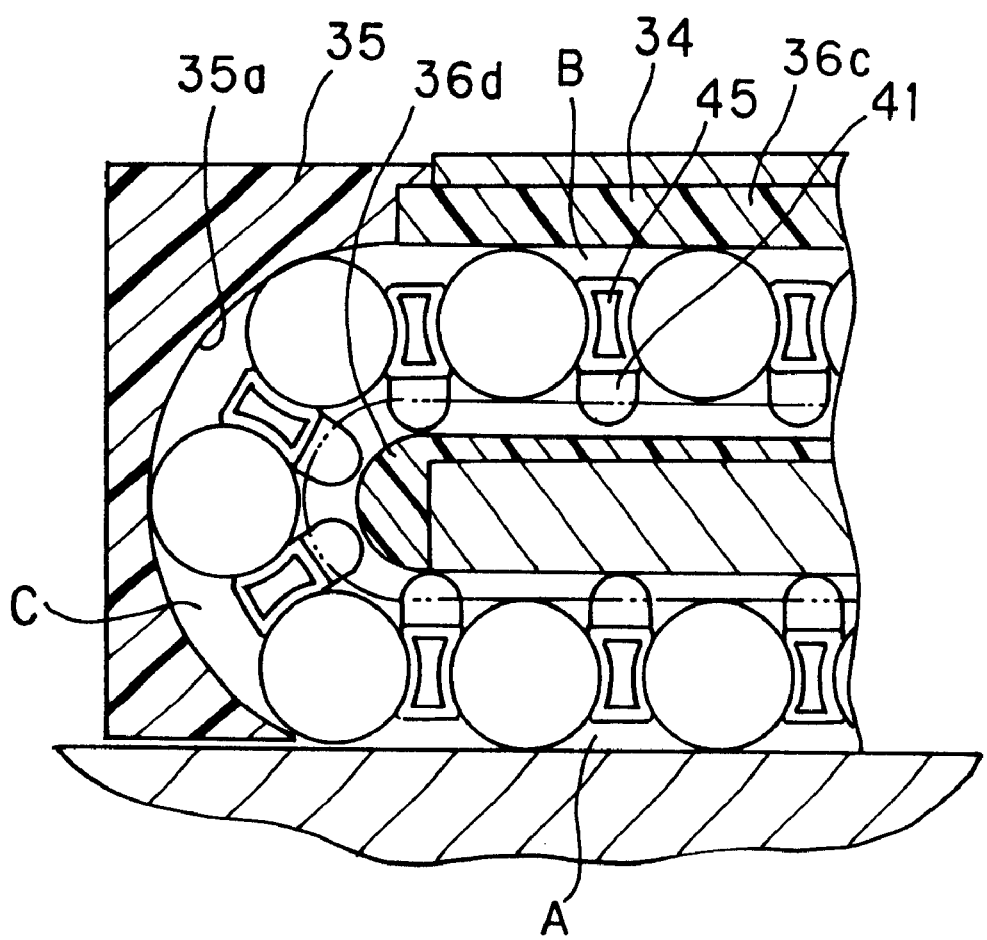
FIG. 14 a sectional view of a roller circulation passage along an axial direction of a rail of the linear motion apparatus of FIG. 12

FIGS. 12 to 14 show a linear rolling motion guide apparatus 31 incorporated with a spacer according to the fourth embodiment of the present invention.

With reference to FIGS. 12 to 14, the linear rolling motion guide apparatus 31 comprises, as like as the apparatus 21 of the former embodiment, a guide rail 22, a movable block 33 assembled with the guide rail 22 to be relatively movable along the guide rail 22, a number of rollers 24, 24, - - - , 24 and a number of balls 25, 25, - - - , 25, and accordingly, like reference numerals are added to the members corresponding to those of the guide apparatus 21 and the detailed explanations thereof are omitted herein.

The movable block 33 is composed of a body portion 34 and a pair of end covers 35 which are fastened to each other by means of bolts or like. The body portion 34 comprises a body block 36a and mold products 36b and 36c, and the mold products 36b and 36c are formed integrally with the body block 36a by injecting a fused resin in a mold in which the body block 36a is preliminarily set, by means of so-called an insertion molding process.

Furthermore, the body portion 34 has a horizontal portion 36 opposing to the upper surface of the guide rail 22 in an assembled state and a pair of bilateral skirt (leg) portions 37 extending downward from both side ends of the horizontal portion 36 so as to oppose to the side surfaces of the guide rail 22 in the assembled state. The horizontal portion 36 is formed with two roller rolling grooves 34a, 34a as loaded roller rolling surfaces opposing to the roller rolling surfaces 22a of the upper surface of the guide rail 22. The skirt portions 37 are formed with upper and lower loaded ball rolling grooves 34b, 34b corresponding to the ball rolling grooves 22b, 22b formed on the side surfaces of the guide rail 22. The roller rolling surfaces 22a and the roller rolling grooves 34a constitute the loaded roller rolling passages A in combination, and on the other hand, the ball rolling grooves 22b, 22b and the loaded ball rolling grooves 34b, 34b constitute the loaded ball rolling passage A'.

The horizontal portion 36 is also formed with two through holes extending in parallel to the roller rolling surfaces 22a of the guide rail 22 in the longitudinal direction of the movable block 33. Tubular portions of the mold products 36c, 36c are inserted into these through holes integrally, and the tubular portions have inner hollow portions formed as roller return passages B. Each of the skirt portions 37 is also formed with two (four in total) through holes in each side extending in parallel to the loaded ball rolling grooves 34b, 34b. The tubular portions of the mold product 36c are inserted into these through holes integrally, and the tubular portions have inner hollow portions formed as ball return passages B'.

With reference to FIG. 13, the mold product 36b is formed integrally with the entire inner surface of the body block 36a including the lower surface of the horizontal portion 36 and the inside surfaces of the skirt portions 37. To the mold product 36b, there are provided roller retaining portions (retainers) 39 for preventing the rollers 24 from coming off from the loaded roller rolling passages A at the time of drawing out the movable block 33 from the guide rail 22, and there are also provided ball retaining portions (retainers) 40 for preventing the balls 25 from coming off from the loaded ball rolling passage A' at the movable block draw-out time.

Referring to FIG. 14, arch-shaped inner periphery guide portions 36d, 36d are formed on both end portions of the body block 36a so as to project outward to thereby form rolling direction changing passages C to the mold product 36c, and to the end covers 35, there are formed outer periphery guide portions 35a, 35a for forming the rolling direction changing passages C in combination with the inner periphery guide portions 36d, 36d when the end covers 35, 35 are mounted to the body block 36a. As mentioned above, the endless roller circulation passage is thus formed by the combination (assembling) of the loaded rolling passage A, the U-shaped rolling direction changing passages C and the return passage B.

According to the linear rolling motion guide apparatus 31 of the present embodiment having the structure mentioned above, when the rollers 24 are circulated, spacers 45 are two-dimensionally changed in their directions. That is, the rollers 24 roll and are changed in the rolling directions from the linear loaded rolling passage A, U-shaped one direction changing passage C, return passage B and U-shaped other direction changing passage C.

There is formed a guide groove 43 to an inner periphery side of the endless roller circulation passage for receiving projection plates 41 of the spacers 45, and in this purpose, the guide groove 43 has a width slightly larger than a thickness of the projection plate 41. When the rollers 24, i.e. spacers 45, are moved in the endless roller circulation passage, the projection plates 41 of the spacers 45 moves along the guide groove 43.

Figure 15:
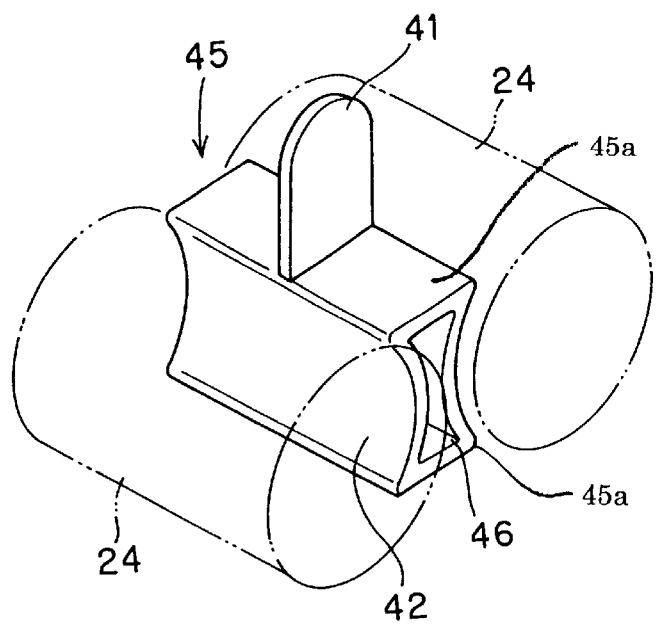
FIG. 15 is a perspective view of the spacer and rollers according to the fourth embodiment.
Figure 16:
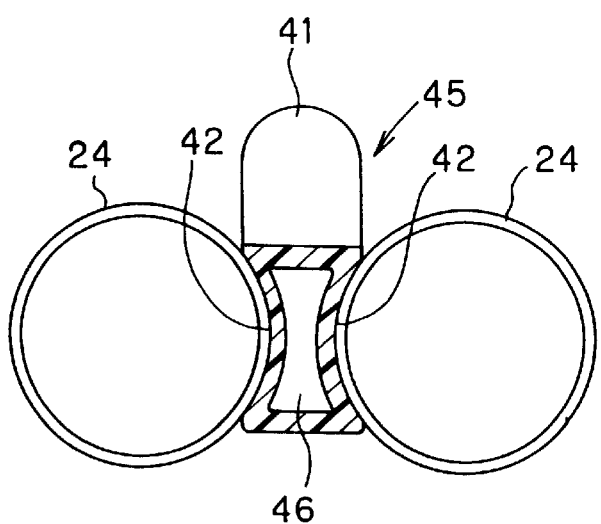
FIG. 16 is a sectional view showing the spacer and the rollers according to the fourth embodiment.

FIGS. 15 and 16 show the spacers 45 of the fourth embodiment of the present invention to be assembled in the linear motion rolling guide apparatus 31.

The spacer 45 is also formed through the molding process of a resin as in the third embodiment mentioned hereinbefore. The spacer 45 is formed with curved retaining surfaces 42 to its both ends in the advancing direction thereof, the retaining surfaces 42 having a shape corresponding to the outer circumferential shape of the roller 24. The spacer 45 is formed with an inner hollow portion (cavity) 46 extending in a direction parallel to the axial direction of the roller 24 so that one of the curved retaining surfaces 42 is elastically deformable towards the other one thereof when compression is applied.

Furthermore, as briefly mentioned above, the spacer 45 is formed with the projection plate 41, different from the spacer 20 in the former embodiment, extending outward (upward) in a direction normal to the axial direction of the roller 24. The projection plate 41 is formed at substantially the central portion of one of connection plates 45a connecting both the curved retaining surfaces 42. The projected end portion of the projection plate 41 is inserted into the guide groove 43 formed on the inner periphery surface of the endless roller circulation passage. Further, it is preferred that the projected end portion of the projection plate 41 has a circular outer shape for easy insertion and smooth circulation in the guide groove 43.

The spacer 45 of this fourth embodiment can attain substantially the same functions as those of the third embodiment, and in addition, according to the spacer 45 of the fourth embodiment, since the projection plates 41 of the spacers 45 can be guided along the predetermined path in the guide groove 43, the rollers 24 supported by the spacers 45 can be moved and circulated smoothly and stably in the endless roller circulation passage without rolling in a meandering manner, for example. Particularly, since the spacers 45 are not moved in the meandering manner in the roller axial direction, the collision of the axial end surfaces of the spacers 45 against the wall portion of the endless roller circulation passage can be effectively prevented.

Figure 17:
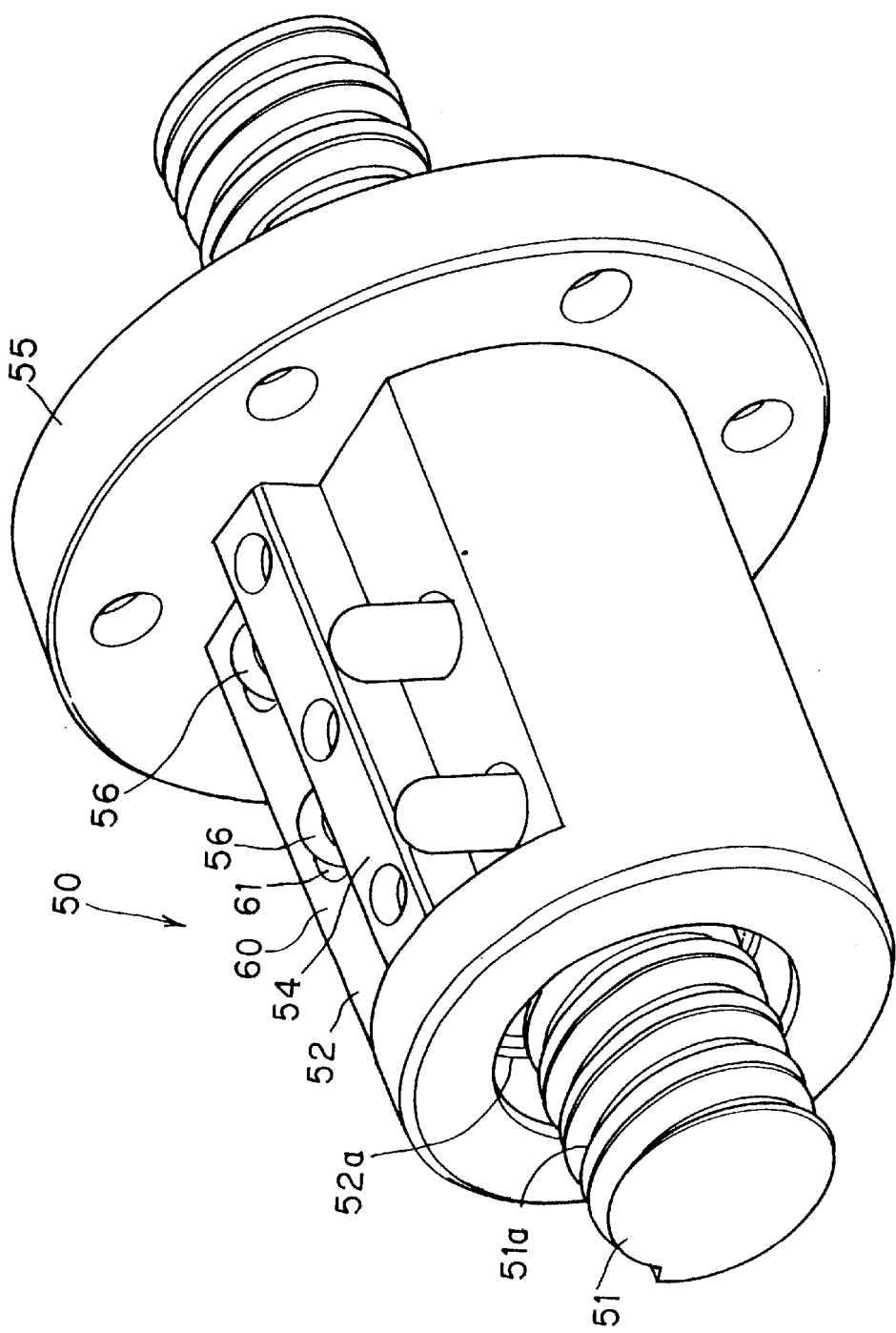
FIG. 17 is a perspective view of a ball screw provided with the spacer of the first embodiment.

FIG. 17 shows a ball screw 50 incorporated with the spacer 5 of the first embodiment of the present invention mentioned hereinbefore. The ball screw 50 comprises: a screw shaft (track shaft) 51 having an outer peripheral surface to which a spiral ball rolling groove 51a as a ball rolling surface is formed; a nut member (slide member) 52 assembled with the screw shaft 51 to be relatively movable thereto, the nut member 52 having an inner peripheral surface to which a ball circulation passage (rolling member circulation passage) including a spiral loaded ball rolling groove 52a as a loaded ball rolling surface corresponding to the ball rolling groove 51a formed on the screw shaft 51; and a number of balls 53, 53, - - - , 53 as rolling members accommodated and arranged in the ball circulation passage and adapted to circulate therein in accordance with the relative motion (rotation) of the screw shaft 51 and the nut member 52. When the nut member 52 is assembled with the screw shaft 51, the ball rolling groove 51a and the loaded ball rolling groove 52a constitute a loaded ball circulation passage of the ball circulation passage.

The ball rolling groove 51a formed on the screw shaft 51 is formed through grinding working, rolling working or like so as to provide a circular shape in section, for example.

As shown in FIG. 17, the nut member 52 has a substantially cylindrical body portion having an end portion to which is formed a flanged portion through which the nut member 52 is connected (fastened) to an object member. The nut member 52 has a flat portion 60 formed on the outer peripheral portion thereof, and the flat portion 60 is formed with a plurality of fitting holes 61 (four in the illustrated embodiment) into which both sides of return pipes 56 are inserted. These fitting holes 61 penetrate the peripheral wall portion of the cylindrical nut body so as to extend inside the loaded ball rolling groove 52a.

Figure 18:
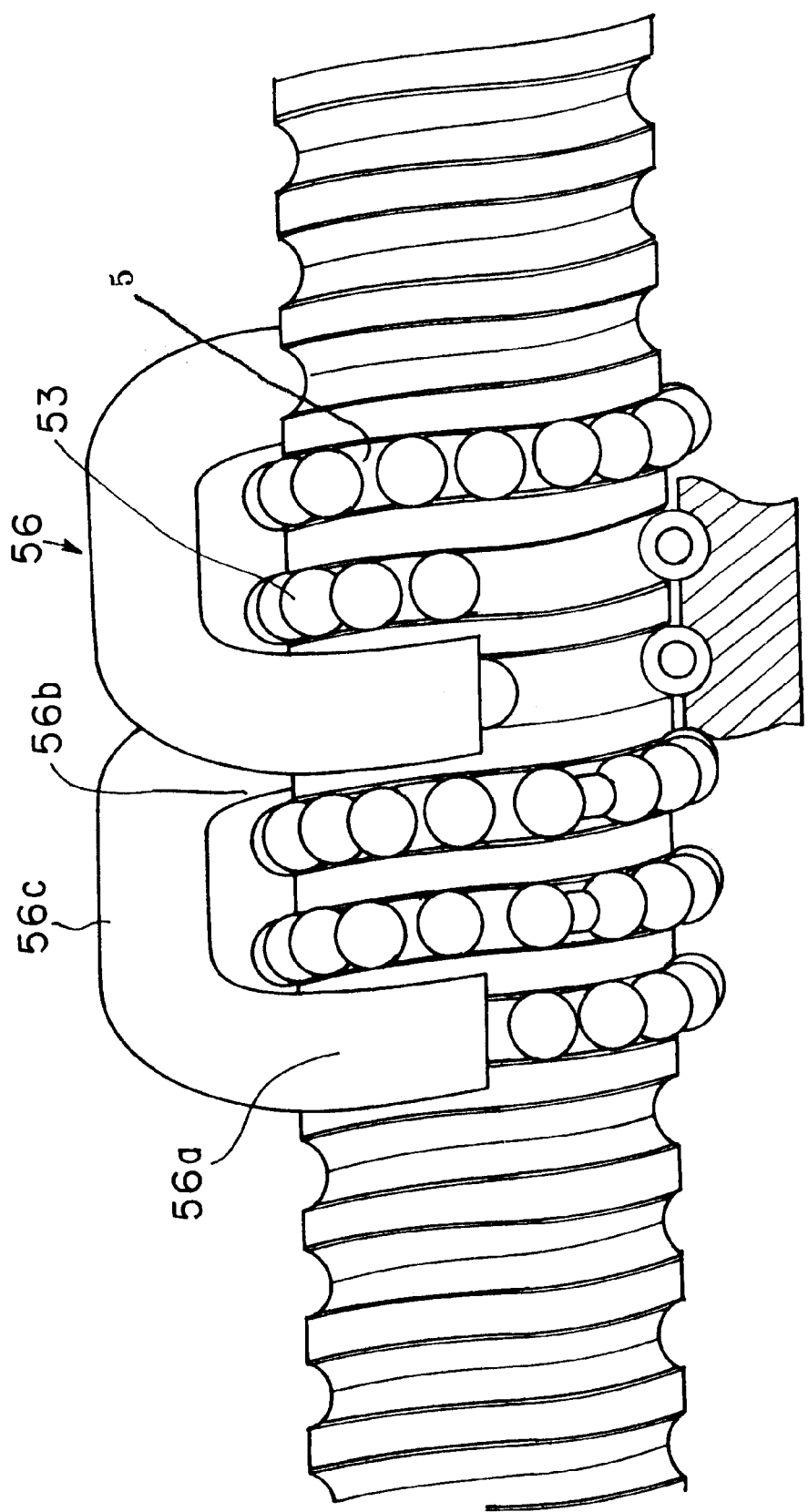
FIG. 18 is a side view of an assembly of a return pipe, a screw shaft and balls of the ball screw of FIG. 17.

The nut member 52 is provided with the two return pipes 56 constituting a non-loaded ball return passage connecting one and the other one end portions of the loaded ball rolling passage. The return pipe 56 has a circular shape in cross section and both end portions thereof are bent at about 90° with respect to the body portion of the nut member 52 so as to provide substantially a gate shape having a horizontal portion 56c and a pair of leg portions 56a and 56b such as shown in FIG. 18. Both the end portions of the return pipe 56 is fitted in the loaded ball rolling passage with an interval of several pitches, and the return pipes 56 are fixed to the nut body portion by means of pipe holder 54 as shown in FIG. 17.

FIG. 18 shows an assembled condition of the balls 53, 53, - - - , 53 and the spacers 5, 5, - - - , 5 disposed in the loaded ball rolling passage and the return pipes 56, in which, however, only some of the spacers 5 appearing their sectional surfaces and being disposed between the balls 53, 53 are shown, and the other spacers are omitted in illustration. The spacers 5 are disposed alternately to the balls 53, that is, one spacer 5 is disposed between adjacent two balls 53, to thereby support or retain the balls 53. When the spacers 5 are formed so as to each provide spherical retaining surfaces 11, as shown in FIG. 5B, so as to arrange the spacers 5 and the balls 53 in substantially a spiral shape, any unreasonable or unnatural force does not act on the spacers 5 and the balls 53 during the circulation in the ball circulation passage.

When the screw shaft 51 is rotated, the balls 53 rolling in the circumferential direction in the ball rolling groove 51a while being applied with the load are scooped by the front end portion of the leg portion 56a of the return pipe 56 and the scooped balls 53 pass in the return pipe 56. The balls 53 are then returned to the ball rolling groove 51a from the other leg portion 56b of the return pipe 56 arranged with several pitched from the former return pipe 56. When the rotating direction of the balls 53 is reversed, the balls 53 are moved and circulated in the manner reverse to that mentioned above. Further, in the arrangement in which the screw shaft 51 is made as a stationary side and the nut member 52 is rotated, the balls 53 may be circulated in the like manner.

The loaded ball rolling passage of the ball screw 50 is formed in the spiral shape as mentioned above and the return pipe 56 acts to change the ball rolling direction. According to the structure of the ball screw of this embodiment, the balls 53 and the spacers 5 are three-dimensionally changed in their rolling directions in a complicated mode. However, the spacers 5 of the present invention are preferred to such complicated motion mode. That is, the spacer 5 can be elastically deformed so as to be contracted in the advancing direction thereof and, moreover, one of the spherical retaining surfaces thereof can be inclined with respect to the other one thereof through the flexibility of the outer peripheral portion of the spherical retaining surfaces 11. Therefore, the respective spacers 5 and balls 53 are both freely three-dimensionally changed in their rolling directions, so that the complicated motion thereof, which required for the screw shaft 50 such as in the present invention, can be smoothly performed.

Further, in the described embodiment of the ball screw 50, the balls 53 rolling in the ball rolling groove 51a of the screw shaft 51 is scooped by the return pipe 56 and returned to a portion of the ball rolling groove 51a by an amount corresponding to several threads (leads) of the spiral groove 51a. However, in an alternation, it may be adopted that a deflector for scooping the balls 53 is provided for the nut member 52. That is, the ball 53 rolling in the ball rolling groove 51a of the screw shaft 51 is drifted away therefrom by the deflector and then returned to the ball rolling groove 51a by an amount corresponding to one lead thereof over the outer diameter portion of the screw shaft 51.

Furthermore, although not shown, the nut member 52 may be composed of a nut body formed with the ball rolling groove 51a and end covers mounted to both end portions of the nut body, in which a ball return passage is formed on the nut body and the end covers are formed with communication passages communicating the ball rolling passage with the ball return passage, as so-called an end-cover-type ball screw.

Still furthermore, the spacers 5, 15, 20 and 45 according to the present invention may be applicable, other than the linear rolling motion guide apparatus and the ball screw mentioned hereinabove as preferred embodiments, to a ball spline apparatus, which comprises a spline shaft as a track member and a slide member as an outer cylindrical member mounted to be movable to the spline shaft through a number of balls.

It is further to be noted that the present invention is not limited to the described embodiments and alternations and many other changes and modifications may be made without departing from the scopes of the appended claims.

What is claimed is:

1. A spacer for a linear motion apparatus which is to be interposed between balls arranged in an endless circulation passage of the linear motion apparatus, said spacer having a body portion comprising spherical retaining surface portions formed for supporting the balls on both end portions thereof in an advancing direction of the spacer when moving in the endless circulation passage and a circumferential surface portion constituting an outer peripheral portion of the spherical retaining surface portions, wherein said spherical retaining surface portion has a radius of curvature smaller than a diameter of the ball and said circumferential surface portion is provided with a groove extending in the circumferential direction thereof so that one of the spherical retaining surface portions is elastically deformable towards another one thereof in the advancing direction.

2. A spacer for a linear motion apparatus which is to be interposed between balls arranged in an endless circulation passage of the linear motion apparatus, said spacer having a body portion comprising spherical retaining surface portions formed for supporting the balls on both end portions thereof in an advancing direction of the spacer when moving in the endless circulation passage and a circumferential side surface portion, wherein said circumferential side surface portion is formed with a plurality of wedge-shaped slits all lying in one plane and extending in a direction normal to the advancing direction of the spacer so that one of the spherical retaining surface portions is elastically deformable towards another one thereof in the advancing direction.

3. A spacer for a linear motion apparatus which is to be interposed between rollers arranged in an endless circulation passage of the linear motion apparatus, said spacer having a body portion comprising curved retaining surface portions formed for supporting the rollers on both end portions thereof in an advancing direction of the spacer when moving in the endless circulation passage and side surface portions connecting both the curved retaining surface portions, wherein an inner hollow portion is defined in the spacer body by said curved retaining surface portions and said side surface portions, said inner hollow portion extending in a direction substantially parallel to an axial direction of the roller so that one of the curved retaining surface portions is elastically deformable towards another one thereof in the advancing direction.

4. A linear motion apparatus comprising:

a track member formed with a roller rolling surface;

a slide member mounted to be relatively movable to the track member formed with a roller circulation passage including a loaded roller rolling groove opposing to the roller rolling surface of the track member when mounted, said slide member being provided with a guide groove formed along the roller circulation passage;

a number of rollers arranged in the roller circulation passage so as to circulate therein in conformity with the relative motion of the slide member with respect to the track member; and a number of spacers arranged between the rollers in an alternate manner, each of said spacers comprising curved retaining surface portions formed for supporting the rollers on both end portions in an advancing direction of the spacer when moving in the endless circulation passage and side surface portions connecting both the curved retaining surface portions, said curved retaining surface portions and said side surface portions defining an inner hollow portion extending in a direction substantially parallel to an axial direction of the roller so that one of the curved retaining surface portions is elastically deformable towards another one thereof, each of said spacers further comprising a projection piece formed on the side surface portion of the spacer so as to project into said guide groove formed on the slide member when assembled.

* * * * *